Dec. 5, 1939.   H. F. VICKERS   2,182,458
FRICTIONAL GEARING
Original Filed Dec. 5, 1936

INVENTOR.
Harry F. Vickers
BY
Barnes, Kisselle, Laughlin & Raisch
ATTORNEYS

Patented Dec. 5, 1939

2,182,458

UNITED STATES PATENT OFFICE 2,182,458

FRICTIONAL GEARING

Harry F. Vickers, Detroit, Mich., assignor to Vickers, Incorporated, Detroit, Mich., a corporation of Michigan Application December 5, 1936, Serial No. 114,327
Renewed April 15, 1939

17 Claims. (Cl. 74—388)

This invention relates to frictional gearings of the type in which frictional rollers are employed to transmit power from a rotary power means to a drive shaft, and has particularly to do with a unit for transferring power motion in accordance with a manual motion.

An object of the invention is to provide a means for manually controlling the transfer of motion from a motor means to a drive shaft. Briefly this is accomplished by mounting, on spider arms of a drive shaft, friction rollers which rotate between constantly turning differential gears and which will, when tilted, impart motion to said spider arms and drive shaft. The device might be used for directing the operation of a power electric drill, the power being transferred at will from a constant speed motor to the drive shaft of the drill. The drill could be readily started and stopped without the interruption of the motor operation. Further uses for the device might be in connection with a die duplicator, winch, or hoist, or any type of conveyor or shaft-driven machine which is used where continual stops and starts or reversals are necessary.

In the embodiment described herein the manual operation results in the automatic transfer of power from the driving means as and when desired. The action may be described as power actuation following up a motion by the operator and will be referred to as follow-up motion.

Other objects and advantages of the invention will be apparent during the course of the following description.

Figures 1, 2:
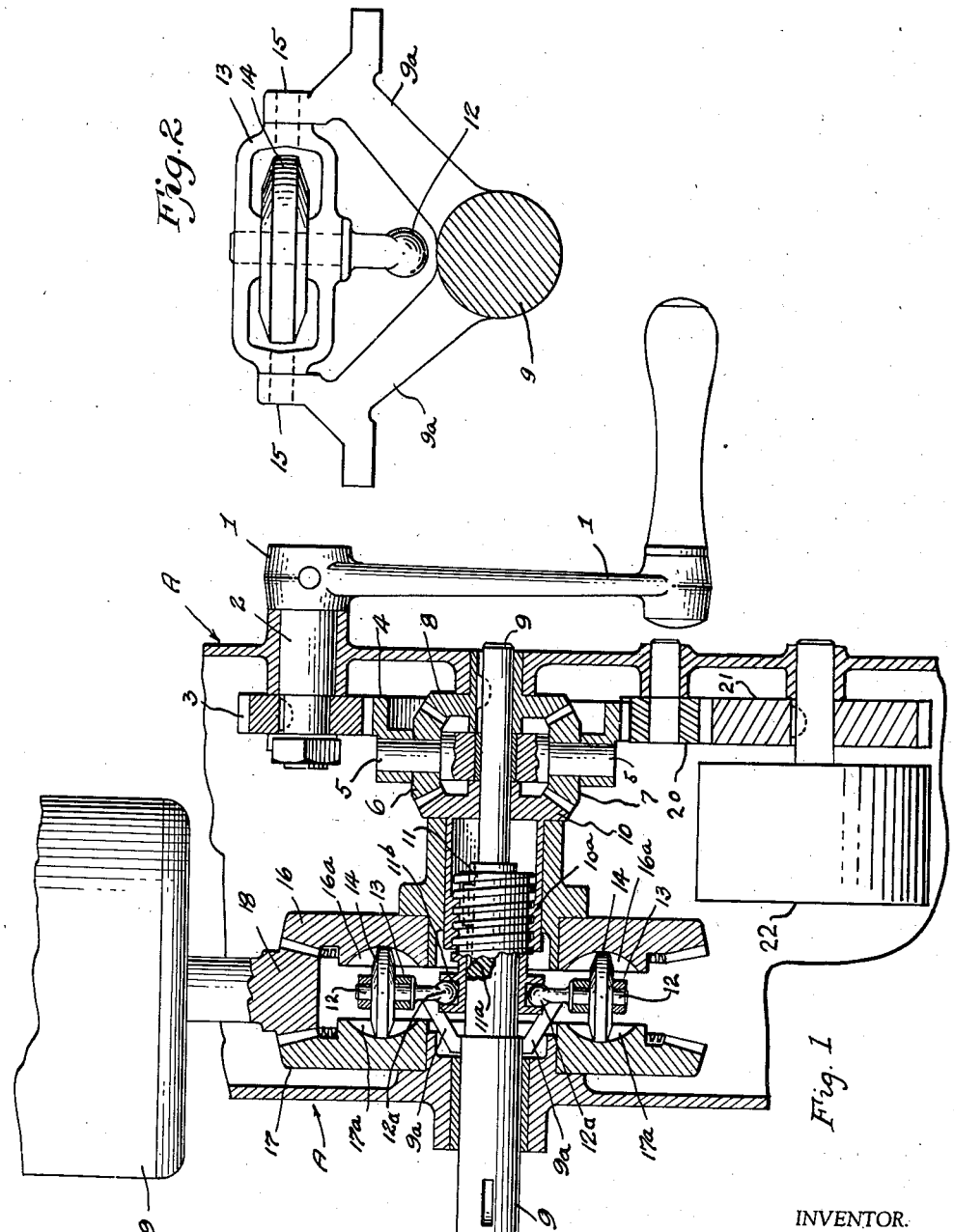
Fig. 1 is a longitudinal sectional view illustrating the relative arrangement of the operative parts.
Fig. 2 is an enlarged detail view transverse of the power shaft showing the shaft spider arms and the trunnion thereon holding the friction roller.

In Fig. 1 wherein, for purpose of illustration, is shown an embodiment of the invention, the housing member may be generally designated A. A hand crank 1 is rigidly keyed to a shaft 2 which is rotatably fitted in housing A. A gear 3, keyed to shaft 2, engages a gear 4, which is rigidly attached to a spider 5, said spider being freely mounted on a drive shaft 9. Differential gear pinions 6 and 7 are also rotatably mounted on spider 5 and engage a differential gear 8, which is keyed to the power output shaft 9, and a differential gear 10, which is freely mounted on shaft 9. Differential gear 10 is provided with an axially extending hub sleeve 10a which is internally threaded.

An externally threaded sleeve 11 engages said internal threads of sleeve 10a which being slidably keyed to shaft 9 by splines 11a. Sleeve 11 is provided at one end with an annular groove 11b into which project pivot balls 12a which are formed on the ends of pivots 12. These pivots 12 are pressed into trunnions 13 and at the same time inserted through the disc shaped friction rollers 14 which rotate freely on said shanks. The trunnions 13, as shown in Fig. 2, are pivoted with a free fit on pins 15 which are pressed into spider arms 9a extending radially from shaft 9.

Rotatably mounted on housing A are driving members in the form of differential gears 16 and 17 having their rotary axes corresponding to the axis of the shaft 9 and their median plane coincident with the centers of the pivots 12 and the friction rollers 14. The inside faces of said gears 16—17 are provided with opposing annular grooves or races 16a—17a. The cross-section of each groove is a segment of a circle, the center of which lies in the median plane between said gears, and the radius of which is equal to the radius of the friction rollers 14.

When assembled, the peripheries of the driven members or friction rollers 14 will be in frictional contact with the surface of the grooves 16a—17a and any rotating of the gears 16—17 will be imparted by friction to the rollers 14 causing them to rotate in the trunnions 13. Gears 16—17 engage pinion gear 18 which is operatively connected to a motor 19 or some other source of rotary power.

*Operation.*—From the foregoing description, it will be seen that when the friction rollers 14 are in neutral position with their rotary axis perpendicular to the shaft 9, the turning of the driving members or differential gears 16—17 in opposite directions by the movement of the pinion gear 18 will also spin the rollers 14 by reason of the frictional contact. In this neutral position, the peripheral speeds at each point of contact of a roller with the respective grooves of gears 16—17 will be equal. Shaft 9 will be stationary.

When crank 1 is turned slightly in either direction, its motion will be translated through gear 3 to gear 4 which will rotate about shaft 9, and, since gear 8 is temporarily stationary with shaft 9, it will act as a fulcrum for pinions 6 and 7 which will rotate on spider 5 and thereby turn differential gear 10 and hub sleeve 10a.

Gear 10 with its threaded hub 10a will rotate about threaded sleeve 11, which being splined to shaft 9, will be moved endwise on said shaft by the action of the threads. This endwise movement of sleeve 11 with its groove 11b will move the pivot balls 12a and pivots 12 and thereby tilt trunnions 13 and friction rollers 14 to a new position. The result will be that the rollers will contact the opposing gears at different radial distances and the peripheral speed at the points of contacts of any one roller 14 and these gears 16—17 will be changed from equal speeds to different speeds, the lesser speed being at the contact point nearer the shaft. Since the gears 16—17 must move at the same rate of speed the difference can only be compensated for by a movement of the friction roller itself, which movement will be imparted to shaft 9 through trunnions 13 and spider arms 9a.

Gear 8 and sleeve 11, however, are keyed to shaft 9 so that any rotation of said shaft will, through pinions 6—7 and gear 10, tend to move sleeve 11 and pivot balls 12a to the neutral position first described. In order, therefore, to obtain a continuous motion of shaft 9 actuated by power gears 16—17, there must be a continuous motion of the hand crank 1. It will further be seen that the speed of the shaft 9 will be directly proportional to the rate at which the handle 1 is turned, said speed ranging from zero to the top speed, the latter being reached when said rollers have been tilted to the edges of the grooves 16a—17a.

In the above showing it will be obvious in every instance that the resistance to movement of the hand crank would be only that afforded by the rolling friction of the rollers in the races 16a—17a regardless of the torque on the operating shaft. In case a large mass is to be connected to the operating shaft it may be desirable to further control the movement of the hand crank so that its acceleration or deceleration and thus that of the operating shaft is gradual. Otherwise the inertia of the mass would carry the neutralizing means beyond neutral position. This further control may be accomplished by connecting an inertia governor to the hand crank apparatus. As shown in Fig. 1, gears 20 and 21, which rotate on shafts mounted in the housing A, are directly connected to a flywheel or inertia governor 22. By proportioning the inertia governor relative to the size of the driven member, it is thus possible to govern the acceleration or deceleration of the hand crank 1 whereby to positively predetermine that such rate of acceleration or deceleration is below the acceleration or deceleration rate of the driven member.

It will be seen that irrespective of the hand crank and gear means connected thereto, the speed of the shaft 9 is directly proportional to and controlled by the angular position of the pivots 12 and the rollers 14. Other means may be used for tilting these rollers without departing from the spirit of the invention.

What I claim is:

1. In a power transmitting unit, a power output shaft, power rotated differential gears mounted concentric to said shaft and having opposing annular grooves on the inner faces thereof, one or more friction rollers rotatably mounted in such manner as to frictionally contact both of said gears within said annular grooves, said one or more rollers being operatively connected with said shaft and adapted to be tilted in said grooves with respect to the axis of said shaft to cause motion to be imparted to said shaft, sleeve means slidably mounted coaxial with said shaft for tilting said one or more rollers to various angles in response to manual movement, and means actuated by said shaft for restoring said one or more rollers to a non-tilted position in the absence of said manual movement.

2. In a power transmitting unit of the follow-up type, a power output shaft, power rotated differential gears mounted concentric to said shaft, spider arms extending radially from said shaft and between said differential gears, friction rollers, pivotally mounted on said spider arms in such manner as to frictionally contact both of said gears, said rollers being adapted to be tilted with respect to the axis of said shaft to cause motion to be imparted to said shaft, means for tilting said rollers to various angles in response to manual movement, and gear and sleeve means actuated by said shaft for restoring said rollers to a non-tilted position in the absence of said manual movement.

3. In a follow-up device for transferring rotary motion from a constantly revolving motor, a power shaft, differential gears driven by said motor and mounted concentric to said shaft and provided with opposing annular grooves each having a cross section formed as a segment of a circle, the center of which would lie in median plane between said gears, radial arms on said shaft extending between said gears, friction rollers pivotally and rotatably mounted on said radial arms and adapted to frictionally contact said gears within said grooves, the centers of said discs being in the median plane of said gears, means for tilting said rollers such that the rotary axis will form an angle with said median plane, and means actuated by said shaft for restoring said rollers to a non-tilted position.

4. In a follow-up device for transferring rotary motion from a constantly revolving motor, a power shaft, differential gears driven by said motor and mounted concentric to said shaft and provided with opposing annular grooves each having a cross section formed as a segment of a circle the center of which would lie in median plane between said gears, radial arms on said shaft extending between said gears, friction rollers pivotally and rotatably mounted on said radial arms and adapted to frictionally contact said gears within said grooves, the centers of said discs being in the median plane of said gears, manually actuated gear and sleeve means for tilting said rollers such that the rotary axis will form an angle with said median plane, and means actuated by said shaft for restoring said rollers to a non-tilted position.

5. In a power transmitting unit of the follow-up type, a power output shaft, power rotated differential gears mounted concentric to said shaft and having opposing annular grooves on the inner faces thereof, spider arms extending radially from said shaft and between said differential gears, friction rollers pivotally mounted on said spider arms in such manner as to frictionally contact both of said gears within said annular grooves, said rollers being adapted to be tilted in said grooves with respect to the axis of said shaft to cause motion to be imparted to said shaft, means for tilting said rollers to various angles in response to manual movement, and means actuated by said shaft for restoring said rollers to a non-tilted position in the absence of said manual movement, said power gears, spider arms, and rollers cooperating to impart rotary motion to said shaft, the rate of said motion being dependent on the degree of tilting of said rollers and ranging from zero to top speed.

6. In a follow-up device for transferring rotary motion from a constantly revolving motor, a drive shaft, differential gears driven by said motor and mounted concentric to said shaft and provided with opposing annular grooves each having a cross section formed as a segment of a circle the center of which would lie in median plane between said gears, radial arms on said shaft extending between said gears, friction rollers pivotally and rotatably mounted on said radial arms and adapted to frictionally contact said gears within said grooves, the centers of said rollers being in the median plane of said gears, means for tilting said rollers such that the rotary axis will form an angle with said median plane, and means actuated by said shaft for restoring said rollers to a non-tilted position, said power gears, spider arms, and rollers cooperating to impart rotary motion to said shaft, the rate of said motion being dependent on the degree of tilting of said rollers.

7. A mechanical follow-up device, comprising a rotating shaft as a source of power, an operating shaft, a hand crank, differential gears operatively connected to said crank coaxial with said operating shaft, one of which is keyed to said shaft, pinion gears operatively connected to said differential gears, said keyed gear serving as a temporary fulcrum for said pinion gears to impart movement from said hand crank and thence to the second of said differential gears, screw and nut means operatively connected to said last named gear and frictional gearing means operatively connected with said screw and nut means and responsive to movement of said second differential gear for transmitting movement from said source of power to said operating shaft.

8. A mechanical follow-up device, comprising a driving shaft, a plurality of driving members actuated thereby at the same speed, in opposite directions of rotation, a driven shaft, and one or more rotary driven members connected with said driven shaft intermediate said driving members and deriving rotary and revoluble motion therefrom, a hand crank, and means operable by said hand crank and by said driven shaft for controlling the revoluble motion derived by said one or more driven members whereby the revoluble motion of said one or more driven members and said driven shaft is directly proportional to the speed at which the hand crank is turned.

9. A mechanical follow-up device, comprising a driving shaft, a plurality of driving members actuated thereby at the same speed in opposite directions of rotation, a driven shaft, and one or more rotary driven members connected with said driven shaft intermediate said driving members and deriving rotary and revoluble motion therefrom, manually operable means for tilting said one or more driven members to various angles whereby revoluble motion is imparted to said one or more driven members and to said driven shaft, and gear and sleeve means actuated by said driven shaft for restoring said one or more driven members to a non-tilted position in the absence of manual movement of said manually operable means.

10. A mechanical follow-up device, comprising a driving shaft, a plurality of driving members actuated thereby at the same speed in opposite directions of rotation, a driven shaft, one or more tiltable rollers connected with said driven shaft intermediate said members and deriving rotary and revoluble motion therefrom, a slidable tilting sleeve having threads formed thereon operatively connected to said one or more tiltable rollers whereby actuation of said sleeve tilts said one or more rollers to driving position, a hand crank, a gear driven by said hand crank, a differential gear on said driven shaft, nut means having threads for engaging the threads of said sleeve and a series of gears connecting said differential gear and said crank gear to said nut means whereby movement of said hand crank actuates said tilting sleeve to a driving position, and movement of said driven shaft, in the absence of movement of said crank, returns said tilting sleeve to a neutral position.

11. In a power transmitting unit of the follow-up type, a rotary power source, a drive shaft, a sleeve slidably mounted on said drive shaft, one or more power driven differential gears, one or more friction rollers having neutral and tilted positions operatively connected to said drive shaft and pivotally mounted adjacent said one or more power gears with rotary axes perpendicular to said shaft when in a neutral position, said one or more friction rollers being adapted to be tilted from neutral position by said sleeve and being frictionally engaged with said one or more power gears whereby a movement of said sleeve will tilt said rollers to drive position to impart rotary motion to said drive shaft from said one or more power gears, a rotatable hand lever, and means operatively connecting said hand lever and said sleeve comprising a series of gears and screw and nut means actuated thereby, whereby rotation of said hand lever actuates said sleeve and maintains said one or more rollers in drive position to drive said shaft at a rate directly proportional to the rate at which said hand wheel is turned.

12. In a power transmitting unit of the follow-up type, a rotary power source, a drive shaft, a sleeve slidably mounted on said drive shaft, power driven differential gears, one or more friction rollers having neutral and tilted positions operatively connected to said drive shaft and pivotally interposed between said power gears with rotary axes perpendicular to said shaft when in a neutral position, said one or more rollers being adapted to be tilted from neutral position by said sleeve and being frictionally engaged with said power gears whereby a movement of said sleeve will tilt said one or more rollers to drive position to impart rotary motion to said drive shaft from said power gears, a rotatable hand lever, and means operatively connecting said hand lever and said sleeve whereby rotation of said hand lever actuates said sleeve and maintains said one or more rollers in drive position to drive said shaft at a rate directly proportional to the rate at which said hand wheel is turned, said means comprising a series of pinion and planetary bevel gears and screw and nut means connected therewith.

13. A mechanical follow-up device, comprising a driving shaft, a plurality of driving members actuated thereby at the same speed in opposite directions of rotation, a driven shaft, and one or more rotary tiltable driven members connected with said driven shaft intermediate said driving members and deriving rotary and revoluble motion therefrom, means for tilting said one or more driven members to various driving angles, a rotatable hand lever, and means operatively connecting said hand lever and said first named means whereby rotation of said hand lever serves to actuate said first named means to tilt said one or more driven members to a drive position which is maintained during the rotation of said hand lever.

14. A mechanical follow-up device, comprising a driving shaft, a plurality of driving members actuated thereby at the same speed in opposite directions of rotation, a driven shaft, and one or more rotary tiltable driven members connected with said driven shaft intermediate said driving members and deriving rotary and revoluble motion therefrom, sleeve means for tilting said one or more driven members to various driving angles, a rotatable hand lever, and means comprising screw and nut means and a series of pinion and planetary bevel gears operatively connecting said hand lever and said sleeve whereby rotation of said hand lever serves to actuate said sleeve to tilt said one or more driven members to a drive position which is maintained during the rotation of said hand lever.

15. A follow-up controlled torque amplifier comprising in combination, a continuously rotating power-operated driving shaft, a driven shaft, the angular position of which is to be controlled, a variable ratio power transmission connected between said shafts and having friction roller elements in constant engagement and constantly rotating, one of which is shiftable to vary the ratio and direction of power transmission between said shafts, a rotary control member, and differential mechanism connected between the control member and the driven shaft for shifting said one roller element to cause the driven shaft to follow the movements imparted to the control member.

16. A follow-up controlled torque amplifier comprising in combination, a continuously rotating power-operated driving shaft, a driven shaft, the angular position of which is to be controlled, a friction transmission of the type having roller elements in constant, non-slipping, rotational engagement connecting said shafts at varying ratios for both directions of rotation of the driven shaft, a rotary control member and differential means connected between the control member and the driven shaft to control the ratio of said transmission.

17. A follow-up controlled torque amplifier comprising in combination, a continuously rotating power-operated driving shaft, a driven shaft, the angular position of which is to be controlled, a variable ratio power transmission connected between said shafts, a rotary control member, and differential mechanism connected between said control member and the driven shaft and arranged to control the ratio of said transmission, said transmission comprising coacting elements in rolling engagement arranged when the control member is stationary to receive the rotation of the driving shaft without imparting rotation to the driven shaft and when the control member is moved ahead of the driven shaft in either direction to impart rotation to the driven shaft at a ratio proportional to the angular displacement of the control member relative to the driven shaft.

HARRY F. VICKERS.